United States Patent Office 3,486,941
Patented Dec. 30, 1969

3,486,941
PROCESS OF MANUFACTURING DRY STORABLE, FORMED NEGATIVE ELECTRODE PLATES OF LEAD-ACID STORAGE BATTERIES
Herbert Haebler, Frankfurt am Main, Germany, assignor to Varta Aktiengesellschaft, Frankfurt am Main, Germany, a corporation of Germany
No Drawing. Filed Sept. 20, 1965, Ser. No. 488,807
Claims priority, application Germany, Sept. 23, 1964, V 26,822
Int. Cl. H01m 39/04
U.S. Cl. 136—27                             11 Claims

ABSTRACT OF THE DISCLOSURE

A process for making a dry storable charged negative electrode plate for lead acid storage batteries in which boric acid is used with black lead oxide, applied to the negative battery grid and the electrode plate is formed in a formation electrolyte consisting of saturated aqueous boric acid solution. The resulting electrode plates contain a high amount of boric acid. They have improved storability and stability against oxidation.

---

The present invention relates to a process of manufacturing negative electrode plates of lead-acid storage batteries and more particularly to a process of manufacturing dry storable, formed negative electrode plates of lead-acid storage batteries, and to such dry storable, dry charged negative electrode plates.

It is known to dip, or immerse, dry charged negative electrode plates into a phenol solution, petroleum, a paraffin solution in petroleum, and the like so as to coat such electrode plates with a thin layer of said protective agents and to prevent oxidation of the lead sponge during storage.

According to another known process, the formed negative electrode plates are dipped, or immersed, into a boric acid solution, whereafter they are dried. This process yields best results when dipping, or immersing, the plates, after drying, a second time into the boric acid solution. This second dipping operation is required because, after formation, the pores of the negative plates are filled with sulfuric acid. Removal of said sulfuric acid by washing leaves the pores of the plates filled with water. As a result thereof, penetration of the protecting agent, on dipping the plates thereinto, is considerably retarded. Therefore, the full protective effect of such a treatment is obtained only after the second dipping operation after dipping the dried plates for a second time into the protective agent solution.

The difficulties encountered in the treatment with boric acid solution are due to the fact that the solubility of boric acid is dependent on the temperature of the solvent. For instance, boric acid is soluble in water to 5% at a temperature of 20° C., to 8.5% at a temperature of 40° C., to 11% at a temperature of 50° C. It is evident that the protective action of the protective agent is temperature-dependent.

It is one object of the present invention to overcome these difficulties and to provide a reliable and simple process of protecting the dry, charged negative electrodes against oxidation.

Another object of the present invention is to provide dry storable, charged negative electrode plates for lead-acid storage batteries which can be stored for a prolonged period of time and can readily be assembled to dry charged batteries, i.e. to batteries which are throughly dried and in the activated or charged condition, which can be shipped and stored without acid, and to which the acid electrolyteis added just before use. Such dry, charged batteries do not lose capacity during storage and may be stored for many years before activation and use.

Other objects of the present invention and advantageous features thereof may become apparent as the description proceeds.

According to the present invention, the negative electrode is produced by first intimately and homogeneously mixing black oxide, i.e. a mixture of lead oxide and finely divided metallic lead, and solid boric acid, pasting said mixture, if required, with the addition of so-called expanders, with water, applying the negative paste to the battery grid or other carrier, and forming the electrode plate in a formation acid consisting mainly of a saturated or nearly saturated aqueous boric acid solution and containing a small amount of a stronger acid, preferably of sulfuric acid, from 2 grams to 50 grams of sulfuric acid per liter, preferably from 2 grams to 10 grams of sulfuric acid per liter.

In this rather simple manner, it is possible to achieve any desired boric acid concentration in the activated material. Dissolution of the boric acid from the active material during formation is prevented by effecting formation in a saturated or nearly saturated boric acid solution. The formation electrolyte may be weakly acidified, for instance, by addition of 2 g. of sulfuric acid per liter electrolyte.

The oxidation preventing effectiveness of boric acid is reduced by increasing concentration of sulfuric acid in the formation electrolyte. Therefore, it is of advantage, to reduce the conventionally used sulfate concentration in the positive as well as negative active material. This reduction of the sulfate concentration has the further advantage that boric acid can partially be replaced by sulfuric acid.

Preferably boric acid is added in the form of a powder or of a concentrated solution. For instance, boric acid is first sieved through a sieve of 0.060 mesh and is mixed with the black oxide in amounts of 10 g. to 40 g. of boric acid per one kilogram of black oxide. No difficulties are encountered when pasting such active material with the usually added amounts of water.

The mechanical resistance of the subsequently formed negative electrode will be higher if small amounts of glycerol are added during pasting or, respectively, mixing, as has been proved by the higher life span of these plates. The addition of glycerol is of advantage if very little sulfuric acid is added to the active mass. In this instance, the boric acid may directly be pasted with glycerol and the glycerol-boric acid paste may be admixed, for instance, by kneading, together with the required amount of water or, respectively, after addition to said required amount of water to the black oxide. When pre-mixing boric acid and glycerol, glycerol-boric acid or boroglyceride is formed. This boroglyceride reacts more rapidly with the black oxide due to its strongly acid property.

On forming the negative plates, a relatively high cell voltage (of about 3 v.) is observed when using a formation electrolyte of boric acid containing only 2 g. of sulfuric acid per litre. Therefore, it is the preferred procedure to preform the plates first with low forming current and to increase the density of the forming current only subsequently, for instance, if the forming current density amounts to 2 a. per square decimeter the initial forming current will be decreased to about 20% of this value.

The conductivity of the formation electrolyte may also be increased by adding conductive salts, such as aluminum sulfate, sodium sulfate, tin sulfate, zinc sulfate, magnesium sulfate, potassium sulfate, or their bi-sulfates respectively, so as to obtain a better voltage characteristic.

The following examples serve to illustrate the present invention without, however, limiting the same thereto.

Example 1

A negative mix is prepared by intimately mixing 10 kg. of black lead oxide, 0.3 kg. of boric acid powder, 0.05 kg. of blanc fixe, 0.02 kg. of lamp black, and 0.03 kg. of lignin sulfonic acid. The dry mixture is made into a paste by the addition of 0.9 l. of water. The resulting uniform paste is applied to the grids by conventional pasting machines, the electrode plates, after drying and curing, in the conventional manner, are formed by immersing them in an open tank in a aqueous saturated boric acid solution containing 5% of boric acid and 0.2% of sulfuric acid until formation is completed. The initial charging current density is about 0.4 ampere per square decimeter, which is subsequently increased to 2 a. per square decimeter. After formation is completed, the negative plates—and, of course, also the positive plates—are washed free of acid and dried rapidly in free air, because the boric acid prevents any oxidation. No further treatment with a boric acid solution is required. The resulting dry, charged negative plates can be stored for at least two years without substantial loss of capacity.

Example 2

The procedure is the same as described in Example 1, whereby, however, the boric acid powder is partly replaced by a saturated aqueous boric acid solution which is used for pasting the dry mixture of the components of the negative plate.

Example 3

The procedure is the same as described in Example 1, whereby, however, the forming saturated boric acid contains, in place of sulfuric acid, 0.3% of aluminum sulfate. The resulting dry, charged negative electrode is also highly stable.

In place of aluminum sulfate, there is added the same amount of magnesium sulfate or of sodium bisulfate to the saturated boric acid solution used for forming the electrodes.

Example 4

The procedure is the same as described in Example 1, whereby, however, 0.3 kg. of boric acid are first mixed with up to 0.45 kg. of glycerol and the resulting mixture is then admixed to the black lead oxide and the other ingredients of the negative plate. Formation is effected in a saturated aqueous boric acid solution without the addition of sulfuric acid or a conductive metal salt. The resulting dry, charged negative electrode plates have a better mechanical strength than the plates obtained according to Example 1.

Example 5

The procedure is the same as described in Example 1, whereby, however, 0.5 kg. of glycerol are added to the water used for pasting the mixture of black lead oxide, boric acid powder, and the other ingredients of the negative plate. Formation is also effected in a saturated boric acid solution without the addition of sulfuric acid or conductive metal salts. The mechanical strength properties of the resulting dry, charged negative electrode plate is superior to that of the plates obtained according to Example 1.

The term "black lead oxide" as used hereinabove and in the claims annexed hereto defines any of the lead oxides used for making lead-acid storage battery plates. Especially suitable are black lead oxides of a high lead content obtained by attrition of lead balls agitated in air or the Barton oxides, both of which contain 20% to 50% of pulverized metallic lead. The present invention, however, is not limited to such a type of lead oxide.

I claim:

1. In a process of producing dry storable, charged negative electrode plates for lead-acid storage batteries, the steps which comprise preparing an intimate mixture of black lead oxide and boric acid, making a paste of said mixture with water, applying it to the active material carrier, forming the negative electrodes in a formation electrolyte consisting of an aqueous saturated boric acid solution, washing the formed electrodes, and drying the same.

2. The process according to claim 1, wherein the formation electrolyte contains a minor amount of a strong acid.

3. The process according to claim 1, wherein the formation electrolyte contains a minor amount of sulfuric acid.

4. The process according to claim 1, wherein the electrolyte contains a minor amount of an acid reacting conductive metal salt.

5. The process according to claim 1, wherein the formation electrolyte contains a minor amount of one of the following: magnesium sulfate and aluminum sulfate.

6. The process according to claim 1, wherein the formation electrolyte contains a minor amount of tin sulfate.

7. The process according to claim 2, wherein between about 0.5% and about 10.0%, by weight, of boric acid are admixed to the lead oxide.

8. The process according to claim 2, wherein between about 1.0% and about 4.0%, by weight, of boric acid are admixed to the lead oxide.

9. The process of claim 1 which comprises incorporating an expander into the mixture of lead oxide and boric acid prior to applying the mixture to the carrier.

10. In a process of producing dry storable, charged negative electrode plates for lead-acid storage batteries, the steps which comprise preparing an intimate mixture of black lead oxide, boric acid, and glycerol, pasting said mixture with water, applying it to the active material carrier, forming the negative electrodes in a formation electrolyte consisting of an aqueous saturated boric acid solution, washing the formed electrodes, and drying the same.

11. In a process of producing dry storable, charged negative electrode plates for lead-acid storage batteries, the steps which comprise preparing an intimate mixture of black lead oxide and boric acid, pasting said mixture with an aqueous solution of glycerol, applying it to the active material carrier, forming the negative electrodes in a formation electrolyte consisting of an aqueous saturated boric acid solution, washing the formed electrodes, and drying the same.

References Cited

UNITED STATES PATENTS

| | | | |
|---|---|---|---|
| 1,788,571 | 1/1931 | Gardiner et al. | 136—26 |
| 2,217,814 | 10/1940 | Pritchard et al. | 136—27 |
| 2,938,063 | 5/1960 | Greenburg et al. | 136—26 |
| 2,996,563 | 8/1961 | Haebler | 136—27 |
| 3,084,207 | 4/1963 | Hughes et al. | 136—27 |

WINSTON A. DOUGLAS, Primary Examiner

A. SKAPARS, Assistant Examiner

U.S. Cl. X.R.

136—34